June 14, 1955 R. S. MELSHEIMER 2,710,921
FREQUENCY DIVIDER APPARATUS
Filed Oct. 19, 1951

INVENTOR
R. S. MELSHEIMER
BY
W. J. O'Neill
ATTORNEY

United States Patent Office 2,710,921
Patented June 14, 1955

2,710,921

FREQUENCY DIVIDER APPARATUS

Robert S. Melsheimer, South Plainfield, N. J., assignor to Bell Telephone Laboratories, Incorporated, New York, N. Y., a corporation of New York Application October 19, 1951, Serial No. 252,094

6 Claims. (Cl. 250—36)

Figures 1, 2:
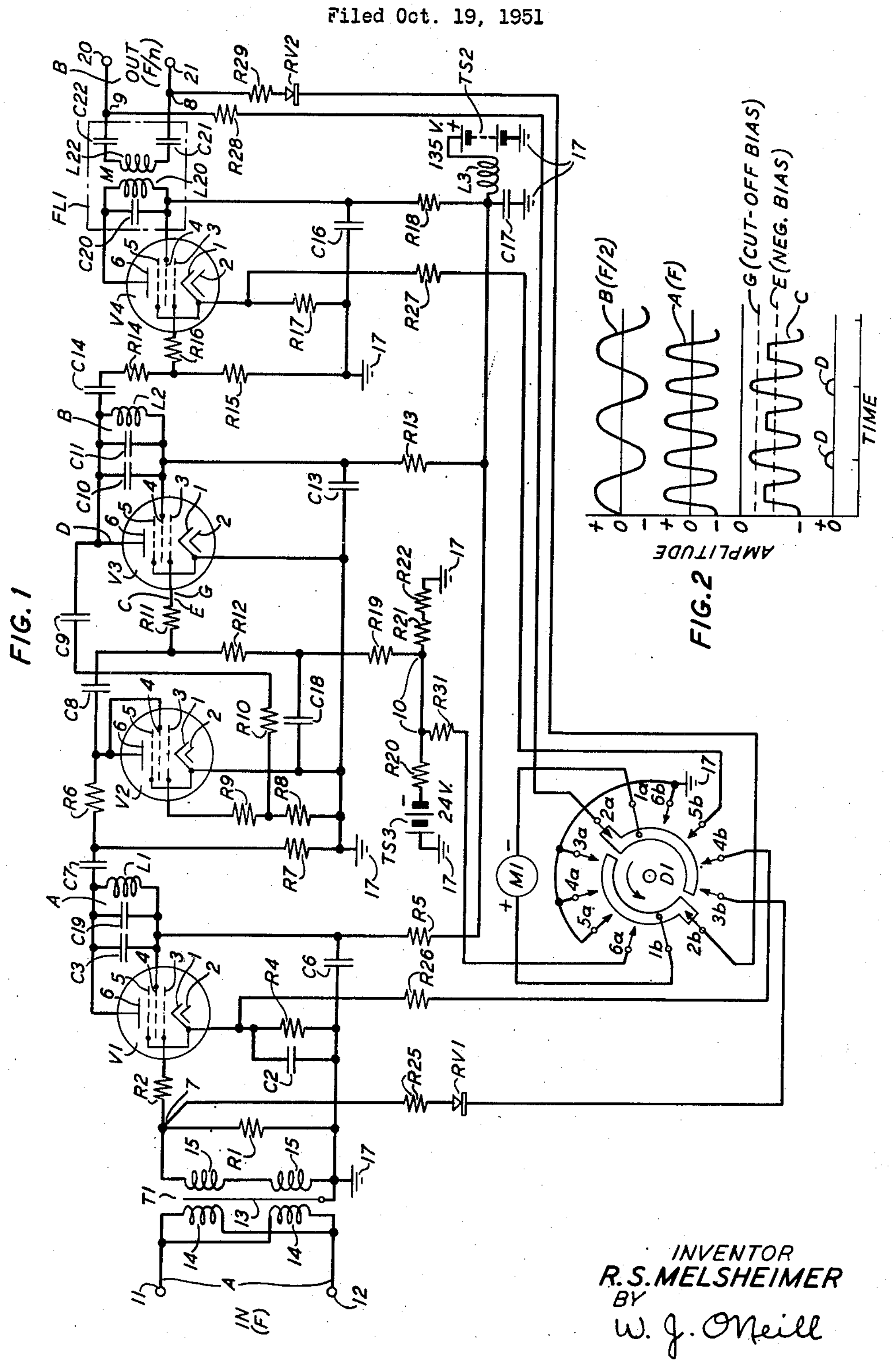

This invention relates to frequency changing systems or apparatus, and particularly to frequency divider apparatus of the clipper type suitable for producing an output frequency which may be an integral sub-multiple frequency of the applied input frequency thereto, such as one-half, one-third, one-fourth, etc. of the input frequency.

One of the objects of this invention is to provide frequency divider apparatus suitable for producing an output frequency which may have a definite sub-multiple frequency relation to the input frequency applied thereto.

Another object of this invention is to provide good voltage-divider action in connection with a clipper type electron tube circuit.

Another object of this invention is to provide a direct-current impedance path action in connection with a clipper type electron tube circuit.

In frequency standard systems, radio signaling systems and other systems, it is often desirable to provide an output frequency which may be derived or produced from an applied input frequency and which may have a definite or integral sub-multiple relation thereto, such as an output sine wave frequency which, for example, may be one-half, one-third, one-fourth, etc. the input sine wave signal frequency. Such a frequency divider system may comprise as components thereof first and second electron tubes wherein the first or clipper tube may act as a voltage peak limiter for clipping off one or more positive voltage peaks of the applied input frequency signal waves and wherein only the remaining unclipped positive voltage peaks thereof may cause the second tube to conduct by overcoming the effect of a suitable bias potential which may be normally applied to the input control grid electrode of the second tube. The second tube may act as an amplifier tube for controlling the plate or anode current conductivity of the first tube and also for providing in its high-Q tuned output circuit a substantially sine wave output frequency of one-half, one-third, one-fourth, etc. the input frequency applied to the first or clipper tube.

In accordance with this invention, the frequency divider system or apparatus may comprise a first or clipper type electron tube, a second or biased class C amplifier tube, and associated circuits and devices therefor adapted for producing from the signal source of applied input frequency F, an integral sub-multiple output frequency $F/n$, where $n$ may be any integer, such as 2, for example. The first or clipper type tube may have its anode and cathode electrodes operatively connected across the source of input frequency F through an input circuit impedance means, such as a resistance or inductance means, which may be disposed in circuit between the anode electrode of the first tube and the source of input frequency F.

In accordance with a feature of this invention, the input circuit impedance means referred to may have an impedance value that is made substantially or sufficiently greater than the operating anode-to-cathode impedance of the first or clipper tube when its control grid electrode is excited positively relative to its cathode electrode, in order to provide good voltage-divider action at the output frequency rate $F/n$ between the two, namely, between the input circuit impedance means referred to and the first or clipper tube, when the input frequency signal F is of positive polarity.

In accordance with another feature of this invention, a direct-current impedance path may be provided between the anode and cathode electrodes of the first or clipper tube, and this direct-current path may include therein the input circuit or first impedance means referred to; and also a second impedance means, such as a resistance or inductance means, which may be connected in circuit between the cathode electrode of the first or clipper tube and one end of the first impedance mans, which end may be the input source end thereof in order to avoid interference with the voltage-divider action referred to above as provided by the first or input circuit impedance means and the first or clipper tube.

The anode and cathode electrodes of the first or clipper tube and the first impedance means referred to above may be coupled to the source of input frequency F through a circuit comprising a reactance coupling means, as a tuned transformer coupling, or through a condenser coupling means having a low reactance at the input frequency F and connected in circuit between the source of input frequency F and the input source end of the first impedance means.

The second or amplifier type tube referred to may be provided with a tuned output circuit which may comprise a resonant circuit tuned to the desired integral sub-multiple output frequency $F/n$ and which may be coupled to an output load circuit by means of a coupling reactance means such as a coupling condenser having a low or other suitable reactance in the output circuit of frequency $F/n$.

For a clearer understanding of the nature of this invention and the additional advantages, features and objects thereof, reference is made to the following description taken in connection with the accompanying drawing, in which like reference characters represent like or similar parts and in which:

Fig. 1 is a schematic circuit diagram illustrating a frequency divider system or apparatus in accordance with this invention; and In Fig. 2 is a graph illustrating examples of voltage and current wave forms taken at various points in the circuit of Fig. 1; curve A representing a sine wave type voltage wave form for the applied input source signal frequency F as provided at A in Fig. 1; curve B representing a substantially sine wave type voltage wave form for an integral sub-multiple output frequency $F/n$, where $n$ is 2, as provided at B in Fig. 1; curve C representing a clipped peak type voltage wave form of frequency F as provided at C in Fig. 1; curve D representing current pulses as provided at point D in Fig. 1; curve E represenitng the magnitude of a fixed negative bias potential as provided at point E in Fig. 1; and curve G representing the plate current cut-off bias voltage of the electron tube V3 in Fig. 1 as provided at point G in Fig. 1.

Referring to the drawing, Fig. 1 is a circuit diagram illustrating a frequency divider system or apparatus having an input frequency F applied at its input terminals 11 and 12 and having an integral sub-multiple output frequency $F/n$, where $n$ is an integer such as two, taken off at its output terminals 20 and 21, and which may, as shown in Fig. 1, comprise generally input terminals 11 and 12, a transformer T1, an input circuit amplifier tube V1, an input circuit coupling condenser C7, a frequency divider means comprising first and second frequency divider tubes V2 and V3, respectively, an output circuit coupling condenser C14, an output circuit amplifier tube V4, an output circuit filter FL1, and output terminals 20 and 21. Also, a suitable meter M1 together with a multicontact selector switch D1 and associated current-limiting resistors R25, R26, R27, R28, R29 and R31 and suitable rectifier diodes RV1 and RV2 may be utilized to provide a relative check on the input and output voltage levels at A and B, bias voltage for the tube V3, and space current of various tubes as tubes V1 and V4 shown in Fig. 1.

As illustrated in Fig. 1, the input terminal source comprises two input terminals 11 and 12 to which may be applied the input source frequency F at A from which it is desired to derive an integral sub-multiple output frequency $F/n$ at B at the output terminals 20 and 21. The input frequency F, which may be that of an alternating-current sine wave signal voltage of wave form as illustrated in curve A of Fig. 2, may from the input terminals 11 and 12 be applied to the input circuit transformer T1 which, as illustrated in Fig. 1, may comprise a grounded core 13, parallel-connected primary windings 14 connected across the input terminals 11 and 12, and series-connected secondary windings 15 which may be grounded at 17 and which may be shunted by a secondary resistor R1 and connected to the input circuit of the amplifier tube V1 having a tuned output circuit comprising the parallel-connected inductance coil L1 and condensers C3 and C19.

The input circuit amplifier tube V1 may, as illustrated in Fig. 1, comprise a pentode type vacuum tube V1 having a cathode electrode 1 which may be connected through a parallel-connected cathode condenser C2 and resistor R4 combination to the grounded end at 17 of the secondary windings 15 of the transformer T1, and which may be heated by a cathode heater filament 2 energized by a suitable source of power supply (not shown); a control grid input electrode 3 which may be connected through a grid resistor R2 to the ungrounded end at 7 of the secondary windings 15 of the transformer T1; a screen grid electrode 4 which may be energized by suitable positive (+) potential through a resistor R5 and retard coil L3 from the power supply terminal source TS2; a suppressor grid electrode 5 which may be connected with the cathode electrode 1; and a plate or anode electrode 6 which may be connected through the resonant circuit C3, C19, L1 and a by-pass condenser C6 to the grounded side at 17 of the cathode condenser C2 and resistor R4, and which may be energized by a suitable positive (+) potential from the power supply source TS2 through the coil L1, the resistor R5 and retard coil L3.

Accordingly, as illustrated in Fig. 1, the input signal frequency F may be applied at the input terminals 11 and 12 at a suitable voltage level from a suitable source. This signal source frequency F may then be applied through the transformer T1 to the input circuit amplifier V1. The amplifier tube V1 may amplify this signal to approximately 70 volts R. M. S. (root-mean-square), or to other suitable value, at the plate electrode 6 of the amplifier tube V1. The tuned circuit condensers C3 and C19 may resonate with the coil L1 thereof at this input frequency F to provide at A a source of signal input frequency F which may be coupled to the frequency divider tubes V2, V3 through a suitable coupling means comprising the coupling condenser C7 having a low reactance at the input frequency F.

As illustrated in Fig. 1, the frequency divider proper may comprise a first or clipper tube V2 and a second or amplifier type tube V3 respectively, which with their associated circuits may be adapted for deriving or producing from the input source frequency F applied to the input of the first divider tube V2 through the coupling condenser C7, an integral sub-multiple output frequency $F/n$ thereof at the tuned output circuit C10, C11, L2 of the second divider tube V3.

The first or clipper tube V2 may, as illustrated in Fig. 1, comprise a pentode type vacuum tube V2 having its respective cathode and plate electrodes 1 and 6 operatively connected across the source of input frequency F, the cathode electrode 1 of the tube V2 being connected through ground 17 to the ground side at 17 of the amplifier tube V1, and the plate electrode 6 of this tube V2 being connected through an input circuit impedance means R6, which may be in the form of a resistor R6, to the coupling condenser C7 which in turn may be connected with the tuned output circuit L1, C3, C19 of the input circuit amplifier tube V1 supplying the input source frequency F.

The impedance of the resistor R6 is made to have a relatively large resistance value compared to the plate resistance of the clipper tube V2, and sufficiently larger than the operating anode 6 to cathode 1 impedance of the clipper tube V2 when the control grid electrode 3 thereof is excited positively relative to the cathode 1 thereof, so that good voltage-divider action may, in accordance with a feature of this invention, take place between the resistor R6 and the clipper tube V2, when the input signal F is of positive (+) polarity and the clipper tube V2 is allowed to conduct.

In order to obtain improved voltage-divider action between the anode-to-cathode operating impedance of the first divider tube V2 and the impedance means R6, the anode-to-cathode operating impedance of the tube V2 may be reduced by any suitable means, such as by connecting one or more tubes in parallel with the tube V2, having the respective anodes 6 of each connected together, the respective control grids 3 of each connected together, and the respective cathodes 1 of each connected together; or by using any electronic tube V2 having an inherently low anode-to-cathode operating impedance with respect to the impedance value of the impedance means R6.

As illustrated in Fig. 1, the clipper tube V2 may, in accordance with a feature of this invention, be provided with a direct-current impedance path extending from the plate electrode 6 thereof to ground 17 and to the grounded cathode electrode 1 thereof, this direct-current ground path being provided through the input circuit resistor R6 and also through another resistor R7 which may be connected between the input source end of the resistor R6 and ground 17, as shown in the Fig. 1 diagram. Connected in this manner, the resistor R7 does not develop an undesirable voltage-divider action with the resistor R6, as it may if it were connected directly from the plate electrode 6 of the tube V2 to ground 17. Also, the direct-current impedance path comprising the series-connected resistors R6 and R7 connected from the plate electrode 6 of the tube V2 to ground 17 as particularly shown in Fig. 1, functions to remove the accumulated charge on condenser C7 during the negative half cycle of the input frequency F, and thereby permits the tube V2 to conduct when its control grid electrode 3 is driven positive. Also, as particularly shown in Fig. 1, no fixed biasing means are provided for normally biasing the control grid 3 of the tube V2 to plate current cut-off.

As illustrated in Fig. 1, the first or clipper divider tube V2 may be a pentode type vacuum tube V2 having a cathode electrode 1 which may be connected directly to ground 17 and also to the suppressor grid electrode 5 thereof, and which may be heated by a cathode heater filament 2 energized by any suitable source of power supply (not shown). The control grid electrode 3 of the first divider tube V2 may be connected through resistors R8 and R9 to ground 17, and through resistors R9, R10 and condenser C9 to the plate or anode electrode 6 of the associated second divider tube V3. The plate electrode 6 of the first divider tube V2 may be connected directly to the screen grid electrode 4 of the tube V2, and may be connected through a condenser C8, a resistor R12 and a by-pass condenser C18 to the grounded cathode 1 of the tube V2.

The second divider tube V3 may, as illustrated in Fig. 1, be a pentode type vacuum tube V3 having a cathode electrode 1 which may be connected to ground 17, and which may be heated by a cathode heater filament 2 energized by any suitable source of power supply (not shown); having a control grid electrode 3 which may be connected through resistor R11 and condenser C8 to the plate electrode 6 of the first divider tube V2, and which may be connected through resistors R11 and R12 and through voltage divider resistors R20, R21 and R22 to a suitable source of negative (−) biasing potential TS3; having a screen grid electrode 4 which may be energized at a suitable positive (+) potential through a resistor R13 and the coil L3 connected to the power supply terminal block TS2; having a suppressor grid electrode 5 which may be directly connected to the cathode 1; and having a plate or anode electrode 6 which may be energized at a suitable positive (+) potential from the power supply source TS2 through the coil L2, the resistor R13 and the coil L3. The plate electrode 6 of the tube V3 is also connected to the control grid electrode 3 of the first divider tube V2 through the condenser C9 and the resistors R10 and R9; and is also provided with a tuned output circuit comprising the parallel-connected retard coil L2 and condensers C10 and C11 tuned to resonate at a sub-multiple output frequency $F/n$ of the input source frequency F, and connected through a by-pass condenser C13 to the cathode electrode 1 of the second divider tube V3.

The negative bias potential for the control grid electrode 3 of the class C amplifier tube V3 may be obtained through resistors R11 and R12 and through a filter comprising the resistor R19 and the condenser C18, and through the voltage divider resistors R20, R21 and R22 connected across the direct-current negative power supply source TS3. Accordingly, the second divider tube V3 is normally negatively biased to or beyond plate current cut-off for class "C" operation, in the absence of positive signal voltage excitation on its control grid electrode 3 as received through the resistor R11 and condenser C8 from the plate electrode 6 of the first divider tube V2. When such a signal voltage of positive polarity as shown by curve C of Fig. 2 sufficient to overcome the negative critical bias potential is applied to the control grid electrode 3 of the second divider tube V3, the tube V3 conducts and sets the associated tuned output circuit C10, C11, L2 into oscillation for some few cycles at the sub-multiple output frequency $F/n$, the condensers C10 and C11 with coil L2 being tuned to this output frequency $F/n$ to form a high-Q resonant circuit at this output frequency $F/n$. The signal voltage at the plate electrode 6 of the tube V3 at this output frequency $F/n$ is then applied to the control grid electrode 3 of the first divider tube V2 through the coupling condenser C9 and through the voltage divider comprising the resistors R10 and R8 which may be utilized as means for attenuating the excitation at the control grid electrode 3 of the first divider tube V2 relative to that at the resonant output circuit C10, C11, L2 of the second divider tube V3.

Thus, the plate 6 of the first divider tube V2 goes positive at the input source frequency rate F, and the control grid electrode 3 thereof goes positive at the output frequency rate $F/n$, the phase of the latter signal being such that it goes through a positive peak while the former signal goes through a positive peak. The tube first divider V2 conducts only when both its plate electrode 6 and its control grid electrode 3 are positive at the same time; and the voltage-divider action as provided by the relatively larger impedance of the resistor R6 and the relatively lesser impedance of the tube first divider V2 takes place at the lower frequency rate $F/n$, removing during this portion of the cycle the positive peak from the control grid electrode 3 of the second divider tube V3. The positive signal voltage of sufficient magnitude to overcome the negative bias potential normally on the control grid electrode 3 of the second divider tube V3 will appear at the control electrode 3 thereof at the lower frequency rate $F/n$, when the plate electrode 6 of the first divider tube V2 is positive and the control grid electrode 3 thereof is negative.

Accordingly, in Fig. 1, where $n$ equals 2 in this example, the first divider tube V2 acts as a voltage peak limiter for clipping or suppressing alternate positive voltage peaks of the signal wave therein as illustrated by curve C in Fig. 2, thereby decreasing the amplitude of such alternate clipped positive half waves of alternating current below a predetermined voltage amplitude level that is insufficient in magnitude to overcome the negative bias potential which is illustrated by the broken line E in Fig. 2 and which is applied to the control grid electrode 3 of the second divider tube V3. The remaining intervening alternate positive voltage peaks, as illustrated by the curve C in Fig. 2, are unclipped by the first divider tube V2, and being sufficient in magnitude to overcome the negative bias potential at E as applied to the control grid electrode 3 of the second divider tube V3, cause the latter tube V3 to conduct as an amplifier during such alternate positive peak signals only, to thereby produce substantially sinusoidal oscillations at B in its high-Q tuned output circuit C10, C11, L2 at an output frequency $F/n$ of one-half the input source frequency F. The resistor R6 has a high resistance relative to the operating plate-to-cathode resistance of the first divider tube V2 for providing a suitable voltage dividing action therebetween, which with the feedback voltage fed from the plate electrode 6 of the tube V3 to the grid electrode 3 of tube V2 cuts off the alternate positive voltage peaks of the input signal voltage applied to the latter tube V2 from the input frequency source F through the coupling condenser C7.

The signal voltage at the integral sub-multiple output frequency $F/n$ appearing at B in the tuned output circuit C10, C11, L2 of the second divider tube V3 may be fed through the coupling condenser C14, through a voltage divider comprising the resistors R14 and R15 and through a grid resistor R16 to the control grid electrode 3 of the output circuit amplifier tube V4, as illustrated in Fig. 1.

The output circuit amplifier tube V4 may, as particularly shown in Fig. 1, comprise a vacuum type pentode V4 having a cathode electrode 1 which may be connected through a cathode resistor R17 to ground 17, and which may be heated by a cathode heater filament 2 energized by a suitable power supply source (not shown); having a control grid electrode 3 which may be connected through resistors R16 and R14 and through the coupling condenser C14 to the tuned output circuit C10, C11, L2 of the tube V3; having a screen grid electrode 4 which may be energized by a suitable positive (+) potential through a resistor R18 and the coil L3 from the power supply source TS2; having a suppressor grid electrode 5 which may be connected to the cathode electrode 1; and having a plate or anode electrode 6 which may be connected through a tuned output circuit C20, L20 and through a by-pass condenser C16 to ground end 17 of the cathode resistor R17 of the tube V4, and which may be energized with a suitable positive (+) potential from the power supply source TS2 through the coil L20, the resistor R18 and the coil L3.

A filter FL1 may be disposed in the plate or output circuit of the amplifier tube V4 and may serve as a tuned output transformer to provide a suitable output voltage level at the output terminals 20 and 21, and for this purpose may comprise a tuned circuit primary winding L20 shunted by a condenser C20, a tuned circuit secondary winding L22 in series with condensers C21 and C22, with mutual inductance M provided between the windings L20 and L22.

A meter M1, a suitable selector switch D1 having terminal contacts 1a to 6a, 1b to 6b, and suitable associated current-limiting resistors R25, R26, R27, R28, R29, and R31 and varistors RV1 and RV2 may be utilized to check the input and output voltage levels, the negative bias potential for the tube V3, and the space current of the amplifier tubes V1 and V4. As illustrated in Fig. 1, the selector switch D1 may be provided with terminals 1a and 1b which may be connected with the meter M1, terminals 6b, 5a, 4a and 3a which may be connected with ground 17, a terminal 3b which may be connected through resistor R25 and varistor RV1 to connection point 7 of the input circuit, a terminal 2b which may be connected through varistor RV2 and resistor R29 to connection point 8 of the output circuit, a terminal 2a which may be connected through resistor R28 to connection point 9 of the output circuit, a terminal 6a which may be connected through resistor R31 to connection point 10 of the bias circuit for the tube V3, a terminal 4b which may be connected through resistor R26 to the cathode electrode 1 of the tube V1 in the space current path thereof, and a terminal 5b which may be connected through resistor R27 to the cathode electrode 1 of the tube V4 in the space current path thereof.

As an illustrative example in a particular case where the input source sine wave frequency F is assumed to be 20 kilocycles per second and the integral sub-multiple output frequency $F/n$ derived therefrom is 10 kilocycles per second, $n$ being the integer 2, the system illustrated in Fig. 1 may be constructed with the following component parts and values: The vacuum tubes V1, V2, V3 and V4 may be 408A type pentodes, or other suitable electron tubes supplied with suitable power supply potentials. The assumed 20 kc. input frequency F may be applied at the input terminals 11 and 12 at a level of about +10 dbm or other suitable value from a 150-ohm or other suitable source. The input circuit amplifier tube V1 may amplify this signal to approximately 70 volts R. M. S., or other suitable value, at the plate electrode 6 of the amplifier tube V1. The condensers C3 and C19 resonate with the retard coil L1 at the assumed 20 kilocycles per second input frequency F. The condensers C10 and C11 with the retard coil L2 form a high-Q resonant output circuit tuned to the 10 kilocycles per second output frequency $F/n$. The filter FL1 in the plate 6 circuit of the output circuit amplifier tube V4 serves as an output transformer to provide a suitable output level, as of about +10 dbm into 600 ohms, at the output terminals 20 and 21. The transformer T1 in the control grid 3 circuit of the input circuit amplifier tube V1 may serve as an input transformer to provide proper impedance termination for the input frequency source, isolation from the balanced input frequency source 11 and 12 to the unbalanced amplifier tube V1 and voltage transformation from the input frequency source terminals 11 and 12 to the control grid electrode 3 of amplifier tube V1. The coils L1, L2, L3, L20 and L22 may have values, for this particular example, approximately as follows as expressed in henries: L1=about 0.01 henry, L2=about 0.01 henry, L3=about 7 henries, L20=about 0.0558 henry, and L22=about 0.0558 henry; and the mutual inductance M between the coils L20 and L22 may be about 0.00968 henry. And for this particular example, the condensers and resistors may have values approximately as follows: C2 about 1 microfarad; C3 and C11 each about 6000 micromicrofarads; C8 about 5000 micromicrofarads; C14 about 1000 micromicrofarads; C19 about 750 micromicrofarads; C6, C13, C16 and C17 each about 4 microfarads; C7 and C9 each about 0.01 microfarad; C10 about 20,000 micromicrofarads; C18 about 0.4 microfarad; C20 about 4520 micromicrofarads; C21 about 9310 micromicrofarads; C22 about 9310 micromicrofarads. As to the resistors: R1 about 600 ohms; R2, R9, R11 and R16 each about 100 ohms; R4 about 330 ohms; R6 and R7 each about 110,000 ohms; R8 and R12 each about 470,000 ohms; R10 about 47,000 ohms; R14 about 1 megohm; R15 about 15,000 ohms; R17 about 470 ohms; R19 about 100,000 ohms; R25 about 9100 ohms; R26 about 47,000 ohms; R27 about 56,000 ohms; R28 about 3900 ohms; R29 about 3900 ohms; R31 about 360,000 ohms; R5, R13 and R18 each about 1000 ohms; R20 about 13000 ohms; R21 about 3600 ohms; and R22 about 330 ohms. As to the varistors RV1 and RV2, these may be germanium diodes similar to the Western Electric Company type 400-A or Sylvania Electric Company types 1N34 or 1N34A. The meter M1 may comprise any suitable direct-current indicating instrument having a full-scale sensitivity of approximately 100 microamperes.

While the foregoing example particularly illustrates values of components for this circuit of Fig. 1 when used for providing an output frequency $F/n$ of about 10 kilocycles per second from an input sine wave frequency F of about 20 kilocycles per second, it will be understood that it may also be provided with suitable values for obtaining other integral frequency divider ratios such as for example an output frequency $F/n$ of 6⅔ kilocycles per second from an input frequency F of 20 kilocycles per second where $n$ equals 3, or an output frequency $F/n$ of 5 kilocycles per second from an input frequency of 20 kilocycles per second where $n$ equals 4, etc., by changing the values of components of C10, C11, L2, and FL1 to suit the desired output frequency $F/n$.

It will also be understood that the circuit of Fig. 1 may be provided with suitable values for obtaining other 2 to 1 frequency divider ratios such as for example an output frequency $F/n$ of 2 kilocycles per second from an input frequency F of 4 kilocycles per second, or an output frequency $F/n$ of 1 kilocycle per second from an input frequency F of 2 kilocycles, etc., by changing the values of components of C3, C19, L1, C7, C8, C9, C10, C11, L2, and FL1 to suit the applied input frequency F and the desired output frequency $F/n$.

Although this invention has been described and illustrated in relation of specific arrangements, it is to be understood that it is capable of application in other organizations and is therefore not to be limited to the particular embodiments disclosed.

What is claimed is:

1. Frequency divider apparatus comprising a source of input frequency, and means responsive to said input frequency for producing therefrom an integral sub-multiple output frequency thereof comprising first and second electron tubes each having its anode electrode individually coupled to the control electrode of the other of said tubes, means normally biasing said second tube beyond cut-off, a tuned output circuit for said second tube comprising a resonant circuit tuned substantially to said integral sub-multiple output frequency, said first tube having its anode and cathode electrodes operatively connected across said source through an impedance means disposed in circuit between said anode electrode thereof and said source, said impedance means having an impedance substantially greater than the operating anode-to-cathode impedance of said first tube, and a direct-current impedance path connected between said anode and cathode electrodes of said first tube comprising said impedance means.

2. Frequency divider apparatus comprising a source of input frequency, and means responsive to said input frequency for producing therefrom an integral sub-multiple output frequency thereof comprising first and second electron tubes each having its anode electrode individually coupled to the control electrode of the other of said tubes, means normally biasing said second tube beyond cut-off, a tuned output circuit for said second tube comprising a resonant circuit tuned substantially to said integral sub-multiple output frequency, said first tube having its anode and cathode electrodes operatively connected across said source through an impedance means disposed in circuit between said anode electrode thereof and said source, said impedance means comprising a resistor having an impedance substantially greater than the operating anode-to-cathode impedance of said first tube, a direct-current impedance path connected between said anode and cathode electrodes of said first tube comprising said impedance means, and a coupling condenser having a low operating reactance at said input frequency connected with and between said source and said direct-current impedance path and connected in series with one end of said impedance means.

3. Frequency divider apparatus comprising a signal source of input frequency, first and second electron tubes each having anode, cathode, and control electrodes, said first tube having its anode and cathode electrodes operatively connected across said source, a tuned output circuit for said second tube comprising a resonant circuit tuned substantially to an integral sub-multiple frequency of said input frequency, means normally biasing said second tube beyond cut-off, means including resistance means individually coupling said anode electrode of each of said tubes to said control electrode of the other of said tubes, a direct-current impedance path connecting said anode electrode of said first tube to said cathode electrode thereof comprising a first impedance means connected between said anode electrode of said first tube and said source and a second impedance means comprising a resistor connected between the input source end of said first impedance means and said cathode electrode of said first tube, said first impedance means having an impedance substantially larger than the operating anode-to-cathode impedance of said first tube.

4. Frequency divider apparatus comprising a signal source of input frequency, first and second electron tubes each having anode, cathode, and control electrodes, said first tube having its anode and cathode electrodes operatively connected across said source, a tuned output circuit for said second tube comprising a resonant circuit tuned substantially to an integral sub-multiple output frequency of said input frequency, means normally biasing said second tube beyond cut-off, means including a condenser and a resistor coupling said anode electrode of said first tube to said control electrode of said second tube, means including a condenser and a resistor coupling said anode electrode of said second tube to said control electrode of said first tube, a direct-current impedance path connecting said anode electrode of said first tube to said cathode electrode thereof comprising a direct-current path resistor connected between said anode electrode of said first tube and said source of input frequency, said resistor having an impedance substantially larger than the operating anode-to-cathode impedance of said first tube, and said direct-current path comprising resistance means connected between the input source end of said resistor and said cathode electrode of said first tube, and a coupling condenser of low operating reactance at said input frequency connected in circuit with and between said source of input frequency and said direct-current impedance path and connected in series with said input source end of said resistor.

5. Frequency divider apparatus of the clipper type comprising a signal source of input frequency, first and second electron tubes each having anode, cathode and control electrodes, said first tube having its anode and cathode electrodes operatively connected across said source, a tuned output circuit for said second tube comprising a resonant circuit tuned substantially to an integral sub-multiple frequency of said input frequency, means normally negatively biasing said second tube beyond cut-off, means coupling said anode electrode of said first tube to said control electrode of said second tube for applying thereto a signal voltage of positive polarity sufficient to overcome said negative biasing thereof, means including resistance means coupling said anode electrode of said second tube to said control electrode of said first tube, a direct-current impedance path connecting said anode electrode of said first tube to said cathode electrode thereof comprising a first resistor connected between said anode electrode of said first tube and said source of input frequency and a second resistor connected between the input source end of said first resistor and said cathode electrode of said first tube, said first resistor having an impedance substantially larger than the operating anode-to-cathode impedance of said first tube when said control electrode thereof is excited positively relative to said cathode thereof for thereby providing good voltage-divider action between said first resistor and said first tube at said output frequency rate when said signal voltage is of positive polarity.

6. Frequency divider apparatus of the clipper type comprising a signal source of input frequency, first and second electron tubes each having at least anode, cathode and control grid electrodes, said first tube being a clipper type tube having its anode and cathode electrodes operatively connected across said source, a tuned output circuit for said second tube comprising a resonant circuit connected across said anode and cathode electrodes of said second tube and tuned substantially to an integral sub-multiple frequency of said input frequency, means including a source of negative bias potential connected in circuit with said control electrode of said second tube for normally biasing said second tube beyond cut-off, connection means including a condenser and a resistor coupling said anode electrode of said first tube to said control electrode of said second tube for applying to said last-mentioned control electrode a signal voltage of positive polarity sufficient to overcome said negative bias potential applied thereto, feedback connection means including a condenser and resistance means coupling said anode electrode of said second tube to said control electrode of said first tube, said resistance means constituting means for attenuating the excitation at said control electrode of said first tube relative to that in said tuned output circuit of said second tube, a direct-current impedance path connecting said anode electrode of said first tube to said cathode electrode thereof comprising a first resistor connected between said anode electrode of said first tube and said source of input frequency and a second resistor connected between the input source end of said first resistor and said cathode electrode of said first tube, said first resistor having an impedance substantially and sufficiently larger than the operating anode-to-cathode impedance of said first tube when said control electrode thereof is excited positively relative to said cathode electrode thereof for providing good voltage-divider action between said first resistor and said first tube at said output frequency rate when said input frequency signal is of positive polarity, a coupling condenser of low operating reactance at said input frequency connected in circuit with and between said source of input frequency and said direct-current impedance path and connected in series with said input source end of said first resistor, and a coupling condenser connected in circuit between said tuned output circuit and an output load circuit.

References Cited in the file of this patent

UNITED STATES PATENTS

| | | |
|---|---|---|
| 2,413,956 | Coykendall | Jan. 7, 1947 |
| 2,438,927 | Labin et al. | Apr. 6, 1948 |
| 2,445,161 | Vogel | July 13, 1948 |
| 2,568,510 | Norrman | Sept. 18, 1951 |